Patented Mar. 25, 1924.

1,488,281

UNITED STATES PATENT OFFICE.

ALFRED PERL, OF CHEMNITZ, GERMANY.

MANUFACTURE OF THREADS, FILMS, RIBBONS, ETC.

No Drawing.   Application filed February 7, 1924.   Serial No. 691,275.

*To all whom it may concern:*

Be it known that I, ALFRED PERL, a citizen of Czechoslovakia, residing at Chemnitz, Germany, have invented certain new and useful Improvements in the Manufacture of Threads, Films, Ribbons, Etc. (for which I have filed application in Germany on November 25, 1920, and likewise an application in Czechoslovakia on June 3, 1922); and I do hereby declare the following to be a full, clear, and exact description of the invention, such as will enable others skilled in the art to which it appertains to make and use the same.

This invention relates to an improved process for the production of threads, films, ribbons, etc., from viscose (cellulose xanthogenate) solutions.

It is known that viscose solutions can be precipitated by introducing them, e. g., through a suitable extrusion or squirting device, into an acid precipitating bath. As precipitating baths it has been proposed to use mineral acid baths or baths containing organic acids. It has also been proposed to add to such baths various mineral salts, as well as organic substances such as glycol, lactic acid and glucose. The high cost of these addition compounds (e. g., glucose and similar organic compounds), however, and their comparative scarcity, are impediments in the enriching of the precipitating baths with these compounds.

It has now been found that exceptionally soft, lustrous and elastic threads, films, etc., can be obtained by introducing the viscose solution into a precipitating bath containing a high percentage of carbohydrates, and that a valuable and particularly advantageous form of carbohydrates for use in such baths is the d-mannose obtained by hydrolysis and saccharification of the shells of the ivory nut or stone nut, or similar fruits, e. g., the corob bean, etc.

In the process of the present invention, the advantageous properties of such carbohydrates are utilized in the acid precipitating baths, into which the viscose solution is introduced.

Waste from ivory nut shells is produced in large amounts from button manufacture. When such waste is ground up to a fine powder, and saccharified under proper conditions with mineral or other acids, and the resulting solution, in which but a small amount of the original powdered nut shells remains in suspension, is filtered and suitably diluted, and its acidity adjusted if desired, a valuable precipitating bath is obtained which gives valuable products, such as referred to above.

The hydrolysis or saccharification can be carried out by treating with acid at an elevated temperature, e. g., with sulfuric acid of 2 to 75%. Any suitable method of saccharification can be used which will give a solution rich in the carbohydrates, particularly in d-mannose. The solution may contain, e. g., from 60 to 80 per cent of carbohydrates, together with the acid remaining from the saccharification treatment. This acidity may be increased through the addition to the solution of a further amount of acid, or the acidity may be decreased through addition of alkalies.

The invention will be further illustrated by the following example:

Fifty parts by weight of ground ivory nut shells, or of ivory nut chips, are saccharified with twice their weight of moderately dilute (75%) sulfuric acid under suitable conditions, for example, by heating to boiling or under pressure until the saccharification has been carried to the desired degree which requires from $\frac{1}{4}$ to 3 hours, preferably about 1 hour. The solution thus obtained is then filtered from solid impurities and diluted to such a degree as to leave from 10 to 30% of carbohydrates in the solution, and the acidity is adjusted to correspond with that desired for the particular viscose to be precipitated. This acidity will vary somewhat with the degree of ripeness of the viscose solution. The resulting solution is used as an acid precipitating bath, and the viscose solution is squirted or extruded therein from suitable extrusion nozzles or devices in the usual way.

The utilization of the novel precipitating bath results in the production of exceptionally soft, lustrous and elastic threads, films, etc., from the viscose solution.

I claim:

1. The process of producing threads, films, ribbons, etc., from viscose solutions, which comprises introducing the viscose solution into an acid precipitating bath containing carbohydrates produced by the saccharification of ivory nut shells or shells of similar fruit.

2. The process according to claim 1 in which the precipitating bath contains from ten to thirty per cent of the carbohydrates.

3. The method of producing a precipitating bath for viscose solutions which comprises subjecting ivory nut shells or shells of similar fruit to saccharification with an acid, filtering the resulting solution and adjusting the carbohydrate content of the solution to about 10 to 30 per cent.

4. The process of producing threads, films, ribbons, etc., from viscose solutions, which comprises introducing the viscose solution into an acid precipitating bath containing d-mannose.

In testimony whereof I affix my signature.

Dr. ALFRED PERL.